Patented June 24, 1941

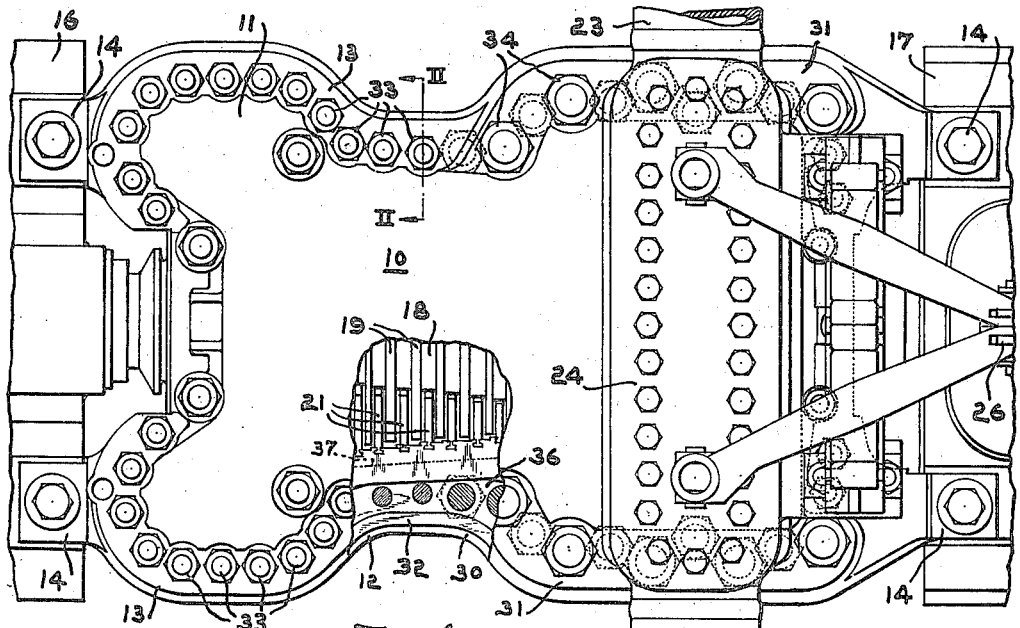

2,247,125

UNITED STATES PATENT OFFICE 2,247,125

CASING JOINT STRUCTURE

James R. Hall, Chester, Pa., assignor to Westinghouse Electric & Manufacturing Company, East Pittsburgh, Pa., a corporation of Pennsylvania Application August 16, 1938, Serial No. 225,088

3 Claims. (Cl. 253—39)

This invention relates to joints for casings subject to high pressures and temperatures, and more particularly to joints of heavily flanged casings for elastic fluid turbines operating under the above-mentioned conditions, and it has for an object the provision of a tight joint of this type.

With turbines operating at high pressures and temperatures it has been found desirable to provide the casing with heavy, bolted flanges to withstand the pressure tending to cause leakage at the joints. However, it is difficult to keep the flange faces sufficiently tight across the entire joint to prevent leakage, such difficulty being due primarily to temperature differences in inner and outer regions of the flanges and adjacent walls.

With relatively heavy walls and flanges the temperature of the inner regions of the walls is much higher than that of the outer regions thereof, or of the flanges, this temperature difference resulting in uneven expansion or warping of the surfaces forming the joint.

In accordance with the present invention, leakage at the joints due to the above cause, is minimized by the provision of slots in the inner surfaces of the casing base and cover, adjacent the joints. These slots allow the casing walls to take any deflection or distortion without opening the inner sides of the joints and also permit penetration of the hot motive fluid toward the center of the relatively heavy mass of metal adjacent the flanged joints, thereby reducing the temperature differential through these regions.

It is, therefore, a further object of the invention to provide a high-pressure casing construction wherein leakage at the joints thereof, due to distortion resulting from pressure and temperature differences, is avoided.

Another object of the invention is the provision of slots in the walls of a high-pressure casing, adjacent the joints thereof, to prevent distortion of the surfaces forming the joints, and attendant leakage.

Yet another object of the invention is the provision of a heavily flanged turbine casing having slots in the inner surfaces of the walls thereof, in the vicinity of the flanges, whereby any distortion due to temperature or pressure differences will take place in the casing walls rather than in the flanges.

These and other objects are effected by my invention as will be apparanet from the following description and claims taken in connection with the accompanying drawing, forming a part of this application, in which:

Fig. 1 is a plan view of a high-pressure turbine embodying the features of my invention, a portion of the turbine casing being broken away;

Fig. 2 is an enlarged fragmentary sectional view taken on the line II—II of Fig. 1, looking in the direction of the arrows; and, Fig. 3 is a fragmentary sectional view similar to Fig. 2, illustrating a modification of the invention.

In the drawing there is shown, at 10, a high-pressure elastic fluid turbine having a casing 11 comprised by a base 12 and a cover 13. The casing 11 is provided with horizontally projecting end lugs 14, bolted, or otherwise secured, to pedestals 16 and 17.

The casing houses a rotor 18 having spaced rows 19 of radially-projecting blades cooperating with similar spaced rows of blades 21 fixedly secured to the casing. Motive fluid, such as steam, is supplied to the casing through the conduits 23, communicating with a steam chest 24, the flow of steam from the chest to the interior of the casing being controlled by the governing apparatus 26.

The casing base 12 and cover 13 have meeting surfaces 32 constituting a joint lying in the horizontal plane passing through the axial centerline of the turbine. The base 12 and cover 13 are provided with external flanges 30 and 31, respectively, the adjacent faces of which constitute continuations of the meeting surfaces 32 of the base and cover. These flanges are provided with bolts 33 and 34 extending therethrough for joining the base and cover, in a well-known manner. Preferably, either or both of the flanges 30 and 31 are provided with leakoff grooves 36.

Fluid tightness of the joints formed by the contacting surfaces 32 and the flanges 30 and 31 held together by the bolts 33 is secured and maintained by relatively deep grooves 37 opening into the casing and formed in the base and cover sufficiently close to the joint to provide for differential expansive movements of the metal of base and cover without distortion of the joint. These grooves are of such depth that the thickness of metal between the bottoms thereof and the flange bolts is somewhat greater than the thickness of the casing walls, whereby any deflection or distortion due to the high temperatures and pressures under which the turbine operates may take place in the casing walls without separation of the inner portions of the meeting surfaces 32.

The dot-dash lines 33 (Fig. 2), indicate diagrammatically the bolt load tending to retain the inner portions of the meeting surfaces 32 in tight sealing engagement.

While generally it will be found desirable to position the grooves substantially parallel to the plane of the joint, as in Fig. 2, there is shown in Fig. 3, a modification of the invention, wherein the grooves 41 extend substantially parallel to the load line of the bolts, rather than parallel to the meeting surfaces 32.

While the invention has been shown in but two forms, both of those being in turbine constructions, it will be obvious to those skilled in the art that it is not so limited, but is equally applicable to any apparatus having a casing construction subject to high pressures and/or temperatures, which casing is formed of a plurality of parts having meeting surfaces forming a joint, and is susceptible of changes and modifications without departing from the spirit thereof and I desire, therefore, that only such limitations shall be placed thereupon as are imposed by the prior art or as are specifically set forth in the appended claims.

What I claim is:

1. An elastic fluid turbine including a rotor, a casing enclosing said rotor and adapted to receive high temperature working fluid under pressure, said casing being generally cylindrical in transverse section and comprising a pair of parts connected by a joint lying approximately in a plane containing the cylindrical axis of the casing, said joint including contacting faces formed on said parts, flange portions integral with said parts and connecting means therefor, and means for securing and maintaining joint fluid-tightness including said parts formed with a relatively deep groove adjacent the joint and open to the casing interior throughout its length, whereby said parts may deflect or distort without opening said joint and said high temperature working fluid may penetrate toward the flanged joint to uniformly heat the structure thereof.

2. An elastic fluid turbine including a rotor, a casing enclosing said rotor and adapted to receive high temperature working fluid under pressure, said casing being generally cylindrical in transverse section and comprising a pair of parts having meeting surfaces defining a joint lying approximately in a plane containing the cylindrical axis of the casing, flange portions integral with said parts and connecting bolts therefor, and means for securing and maintaining joint fluid-tightness including said parts formed with a relatively deep groove adjacent the joint and open to the casing interior throughout its length, whereby said parts may deflect or distort without opening said joint and said high temperature working fluid may penetrate toward the flanged joint to uniformly heat the structure thereof.

3. An elastic fluid turbine including a rotor, a casing enclosing said rotor and adapted to receive high temperature working fluid under pressure, said casing being generally cylindrical in transverse section and comprising a pair of parts having meeting surfaces defining a joint lying approximately in a plane containing the cylindrical axis of the casing, flange portions integral with said parts and having bolt holes therethrough, bolts extending through said holes for connecting the parts, and means for securing and maintaining joint fluid-tightness including said parts formed with a relatively deep groove adjacent the joint and open to the casing interior throughout its length, said groove being of such depth that the bottom thereof is spaced from the bolt holes a distance greater than the thickness of the casing walls, whereby said parts may deflect or distort without opening said joint and said high temperature working fluid may penetrate toward the flanged joint to uniformly heat the structure thereof.

JAMES R. HALL.